United States Patent [19]
Mendicino et al.

[11] Patent Number: 6,131,597
[45] Date of Patent: Oct. 17, 2000

[54] METHOD AND APPARATUS FOR CUTTING, SEALING AND OPENING PIPE

[75] Inventors: Kerrigan Mendicino, Parma; Gregory D. Schroeder, Berea; Christopher S. Arthur, Litchfield, all of Ohio

[73] Assignee: The Pipeline Development Company, Westlake, Ohio

[21] Appl. No.: 09/298,424

[22] Filed: Apr. 23, 1999

[51] Int. Cl.[7] .......................... F16K 43/00; B23D 21/04; F16L 55/18

[52] U.S. Cl. .............................. 137/15.14; 30/94; 83/745; 137/318

[58] Field of Search ............................. 137/15.13, 15.14, 137/15.12, 318; 30/92, 94, 95, 96, 98; 82/78, 113; 83/745, 469, 471.2, 471.3, 473, 477, 477.1

[56] References Cited

U.S. PATENT DOCUMENTS

| | | | |
|---|---|---|---|
| 3,603,387 | 9/1971 | Schoeffler | 137/318 |
| 3,650,547 | 3/1972 | Tickett | 137/318 |
| 3,652,107 | 3/1972 | Tickett | 137/318 |
| 3,703,906 | 11/1972 | Tickett | 137/318 |
| 3,735,775 | 5/1973 | Tickett | 137/318 |
| 3,785,041 | 1/1974 | Smith | 29/471.3 |
| 3,833,020 | 9/1974 | Smith | 138/94 |
| 3,863,667 | 2/1975 | Ward | 137/318 |
| 3,867,964 | 2/1975 | Gardner | 138/89 |
| 4,177,827 | 12/1979 | Smith et al. | 137/318 |
| 4,355,656 | 10/1982 | Smith | 137/318 |
| 4,370,995 | 2/1983 | Smith | 137/15 |
| 4,516,598 | 5/1985 | Stupak | 137/318 |
| 5,509,440 | 4/1996 | Cantaloube et al. | 137/318 |
| 5,732,728 | 3/1998 | Maichel | 137/318 |

Primary Examiner—George L. Walton
Attorney, Agent, or Firm—Pearne & Gordon LLP

[57] ABSTRACT

A method and apparatus for stopping or otherwise altering fluid flow in a pipeline at a desired location, originally without provisions to do so, and particularly suited for use with heavy wall pipes. The method and apparatus includes use of chip forming cutting tools that are carried in a circumferential orbit around the pipe within a housing assembled around the pipe. The cutting tools are progressively advanced into the wall of the pipe to cut two axially spaced circumferential grooves in the pipe wall. Thereafter, a shear plate with cutting edges coinciding with the grooves can be forced through the pipe to sever a coupon from it and thereby gain access and control over flow through it.

9 Claims, 3 Drawing Sheets

METHOD AND APPARATUS FOR CUTTING, SEALING AND OPENING PIPE

BACKGROUND OF THE INVENTION

The invention relates to a method and apparatus for stopping or altering the flow of fluid in a live pipeline.

PRIOR ART

U.S. Pat. Nos. 3,785,041, 3,833,020, 3,863,667, 3,867,964, 4,177,827, 4,355,656 and 4,370,995 disclose methods and apparatus for controlling the flow of fluid in a live pipeline at a desired location where no provision for such control is originally made in the line. These systems use a shear operating in a fluid tight housing assembled around the pipe to cut through the pipe wall and stop or divert flow from the line. Use of a shear blade to cut into the wall of the pipeline affords several advantages over other known techniques. The time required to cut through the pipe wall is relatively short. The shearing action produced by the blade is essentially chipless so there is little risk of chips being introduced into the pipeline flow. Since the shear is a monolithic structure, there is essentially no risk of cutting tool failure. The shear technique, additionally, has the advantage of cutting generally planar transverse faces on the pipeline thereby simplifying the task of sealing off one or both lengths of the severed pipeline. The shearing apparatus and the supporting power system can be readily used in confined and hazardous areas.

Known pipeline shearing techniques while having been proved to be quite beneficial in ordinary pipeline systems have not, as yet, been applied to heavy wall pipelines because of the difficulty in obtaining a positive shear cutting action.

SUMMARY OF THE INVENTION

The invention provides a technique for efficiently and safely controlling the flow in heavy wall pipelines at desired locations where the original line is devoid of a valve, fitting or the like to facilitate such control. The invention involves the formation of relatively deep circumferential grooves on the pipe at parallel spaced planes. The planes of these grooves correspond to the cutting edges of a shear plate used to subsequently cut through the pipe wall and separate a coupon or short length of pipe from the remaining sections. The grooves, in accordance with the invention, are cut on the pipeline after a housing has been assembled around the site of the pipe area to be sheared. The grooves are cut by cutters that are of a chip-forming type. The cutters are caused to orbit around the pipe circumference in the housing while they are progressively advanced radially into the pipe wall. When the grooves are sufficiently deep, the cutters are removed to allow operation of the shear plate.

In the illustrated' embodiment, the cutters are mounted on a rigid circular carrier assembled around the pipe. The carrier has peripheral sprocket teeth or other equivalent drive means to permit it to be forcibly rotated preferably by a suitable motor located externally of the housing. For simplicity, the radial advance of the cutters can be accomplished by manual adjustment as the groove cutting process proceeds. The disclosed groove cutting elements have a unique configuration to improve cutting action and to reduce frictional drag.

DESCRIPTION OF THE PREFERRED EMBODIMENT

Figure 1:
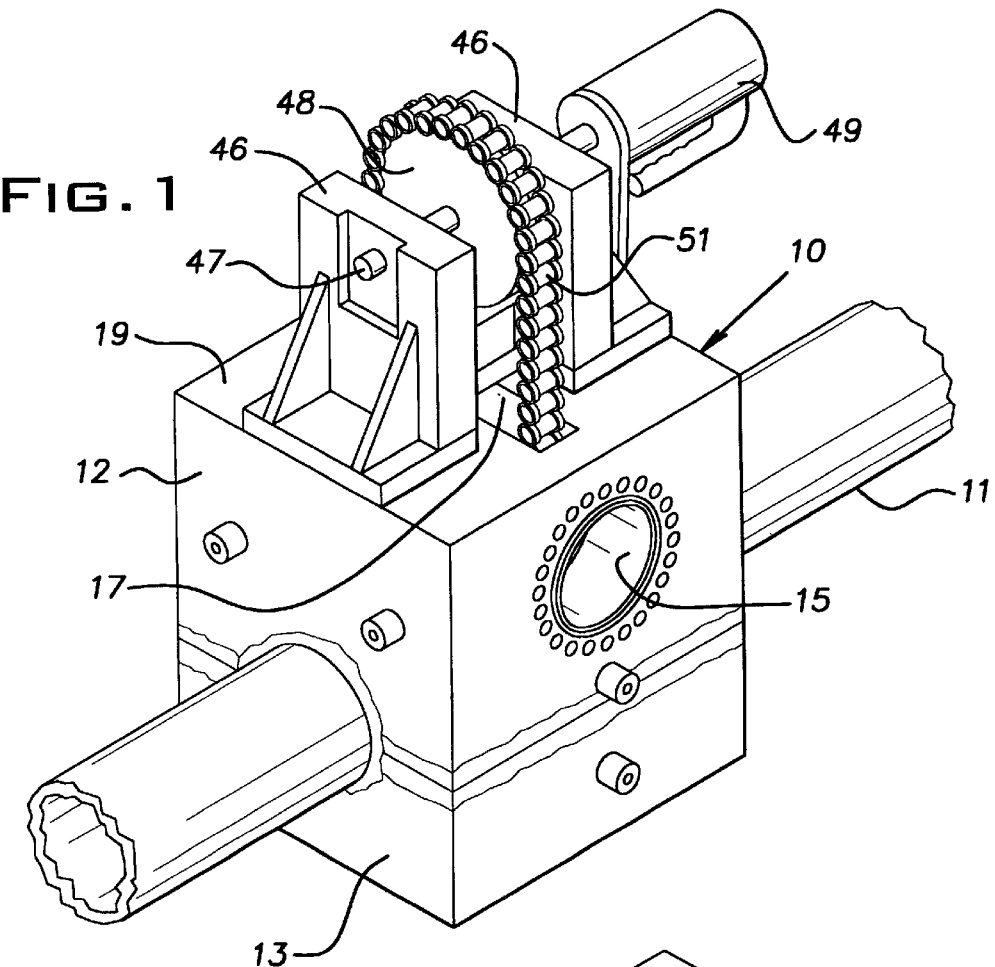
FIG. 1 is a perspective view of an apparatus for practicing the invention including a housing mounted on a pipeline.

Referring now to the figures there is shown a generally rectangular housing 10 assembled around a pipeline 11 at a selected location where there previously has been no other flow control or coupling device. The housing 10, preferably fabricated of steel, and formed of two mating sections 12 and 13, is fixed to the pipeline 11 by conventional welding techniques. The sections 12, 13 are prefabricated as weldments and/or machined parts. Aforementioned U.S. Pat. Nos. 3,785,041, 3,833,020, 3,863,667, 3,867,964, 4,177,827, 4,355,656 and 4,370,995 show similar arrangements and their disclosures are incorporated herein by reference. For explanation purposes, a larger section 12 of the housing is referred to as the upper section and a smaller section 13 is referred to as the lower section. It should be understood, however, the housing 10 can be mounted in any desired or required orientation. A transverse bore in the upper section 12 is arranged to receive a valve similar to that shown in U.S. Pat. No. 4,177,827, for example. The housing 10 is sufficiently hollow to leave a space surrounding the pipe 11 in which a shear plate can operate in a plane transverse to the axis of the pipe. Before the housing 10 is fixed in place on the pipe 11, a pair of reinforcing rings 16 can be welded on the periphery of the pipe to ensure the integrity of the pipe during subsequent shearing action. These rings 16 are diametrally split to enable them to be assembled around the pipeline 11. Both the top and bottom sections 12, 13 of the housing have openings 17, 18 at their respective outward faces 19, 20.

Figure 2:
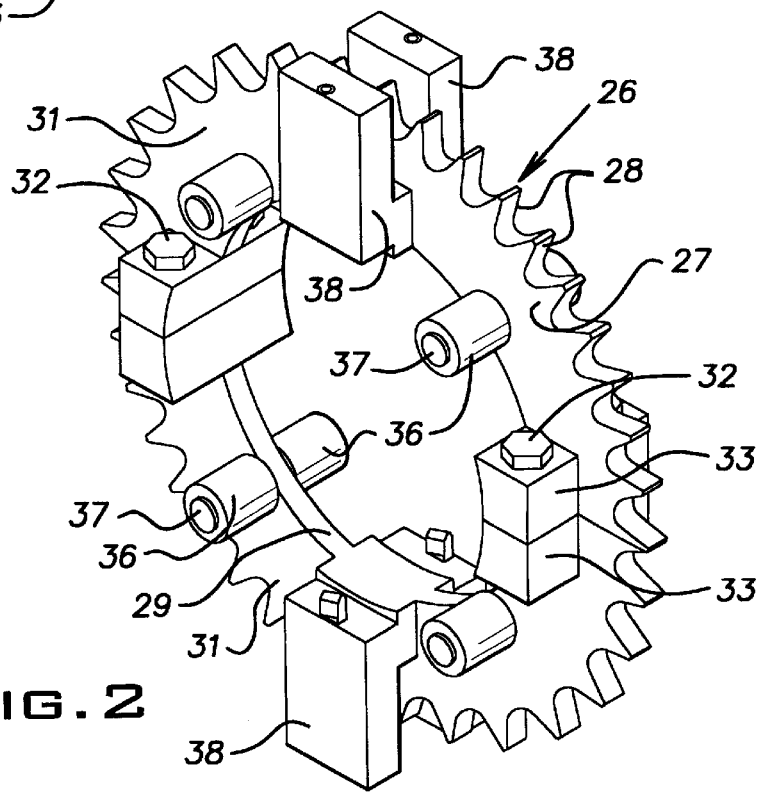
FIG. 2 is a perspective view of a cutting tool carrier of the invention adapted to be assembled around the pipeline.
Figure 3:
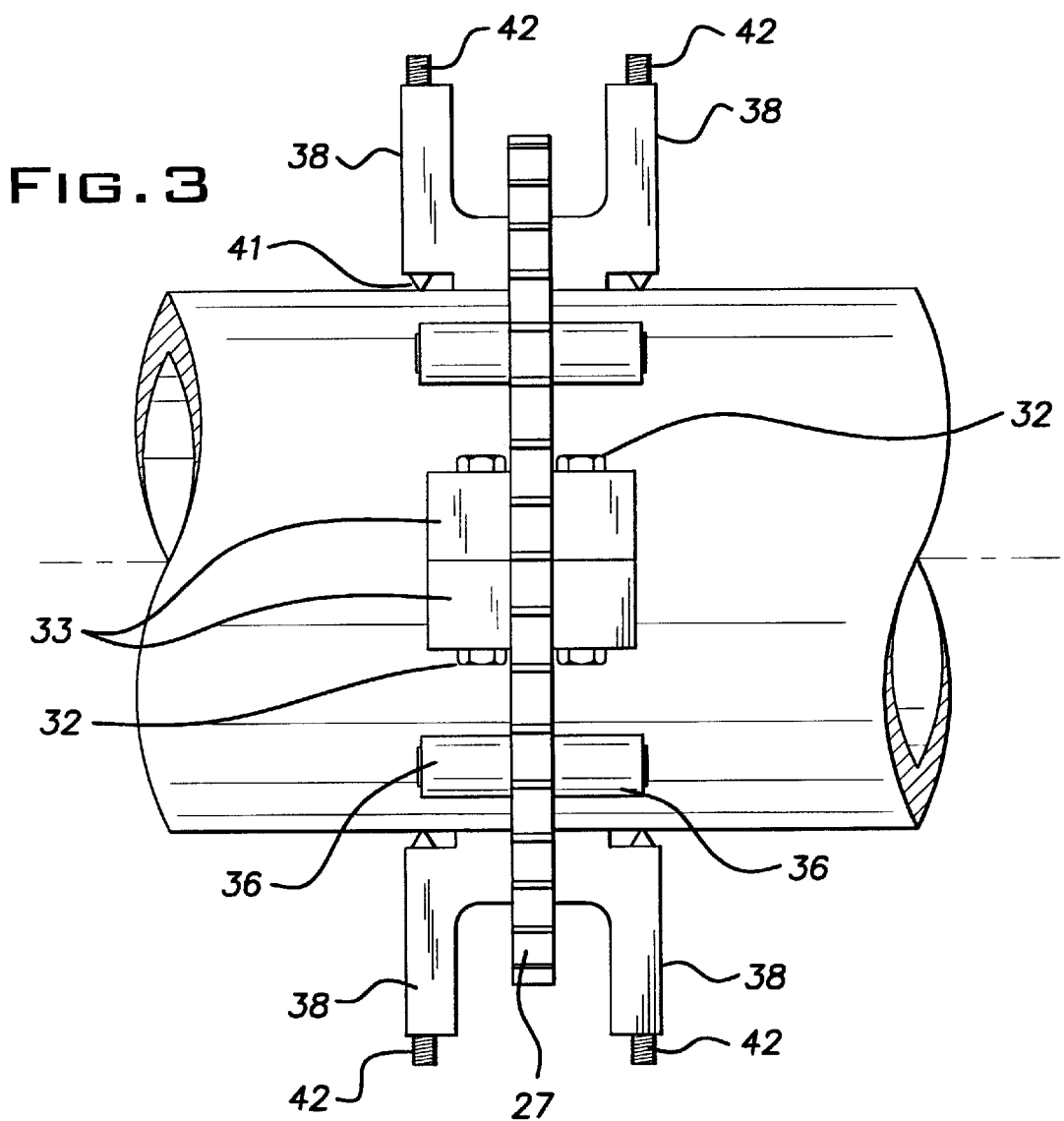
FIG. 3 is an elevational view of the cutting tool carrier assembled around the pipeline.

FIG. 2 illustrates a cutting tool carrier 26 in the form of an annular rigid body. The carrier body 26 in the illustrated embodiment is fabricated from a steel chain sprocket 27 having peripheral teeth 28. The sprocket 27 has a central bore 29 sized to fit over the pipeline 11 with moderate clearance. The sprocket 27 is split on a diametral plane. Two sprocket halves 31 are held together by bolts 32 assembled through holes in small flange blocks 33 welded or otherwise fixed on respective sprocket halves.

Figure 4:
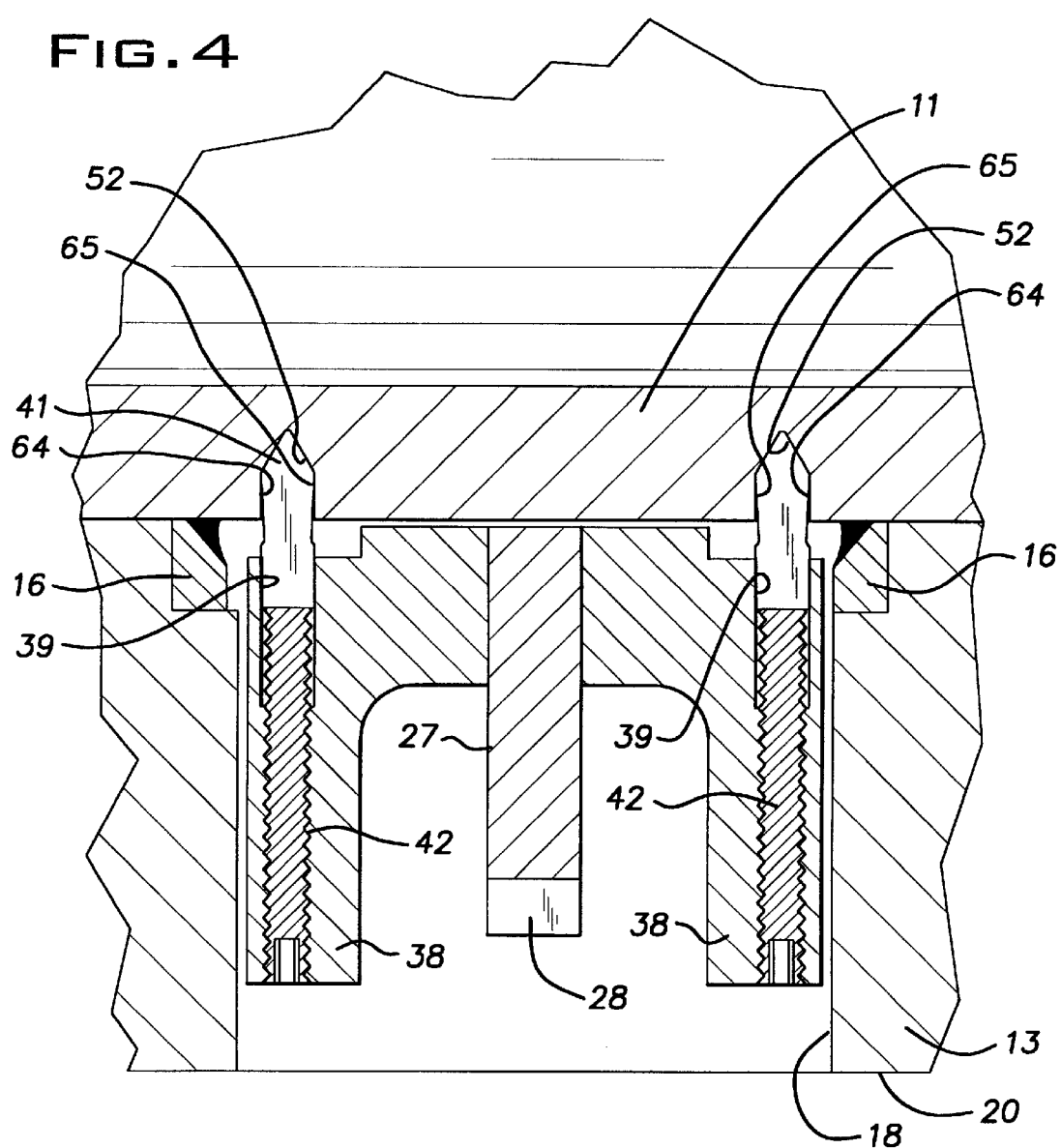
FIG. 4 is an enlarged fragmentary view of the carrier showing the cutting tools after they have cut parallel grooves in the wall of the pipeline.

A plurality of rollers 36 on each side of the sprocket 27 are mounted on shafts 37 in parallel alignment with the axis of the sprocket. The rollers 36 are positioned so that they are tangent to a circle with a diameter equal to the outside diameter of the pipeline 11. Cutting tool mounting blocks 38 are welded or otherwise fixed on each side of the sprocket 27. Each tool mounting or carrier block 38 has a radially oriented rectangular bore or guideway 39 in which is received a cutter 41. In the illustrated case, there are two diametrally opposed blocks 38 and associated cutters 41 on each side of the sprocket 27. The radial position of each cutter 41 is adjustably determined by a socket head set screw 42 threaded into a bore aligned with each rectangular bore 39. The set screws, as shown in FIG. 4, have sockets at their radially outer ends for receiving an Allen wrench or like driver.

A pair of spaced brackets 46 are removably bolted or otherwise mounted on the top face 19 of the upper housing section 12. The brackets 46 support a shaft 47 on which is fixed a drive sprocket 48 between the brackets 46. The shaft 47 is driven in rotation by a hydraulic motor 49 or other suitable driver. The carrier 26 is assembled together over the pipeline 11 within the housing 10. This is accomplished manually by handling and manipulating the carrier sprocket halves 31 and bolts 32 through the openings 17, 18 in the outer faces 19, 20 of the housing sections 12, 13. A roller chain 51 is then assembled over the teeth 28 of the sprocket 27 and the drive sprocket 48 with its ends thereafter joined to form an endless loop in the customary manner.

The carrier mounted tools or cutters 41 form spaced circumferential grooves 52 in the pipe wall within the housing 10 in the following manner. The motor 49 is energized to drive the carrier body 26 in rotation about the pipeline 11. After a limited number of rotations of the carrier 26 the motor 49 is stopped and the adjustment screws 42 are tightened slightly to advance their respective cutting tools 41 radially into the wall of the pipe. One advantageous technique is to adjust both of the screws 42 on one half of the carrier body 26 every other time the motor is stopped, and to adjust the screws 42 on the other half of the carrier body 26 at intervening times when the motor is stopped. The depth to which the cutter tools 41 have cut away the wall of the pipe can be gauged by the position of the socket ends of the screws 42 in their respective blocks 38.

Figures 5, 6:
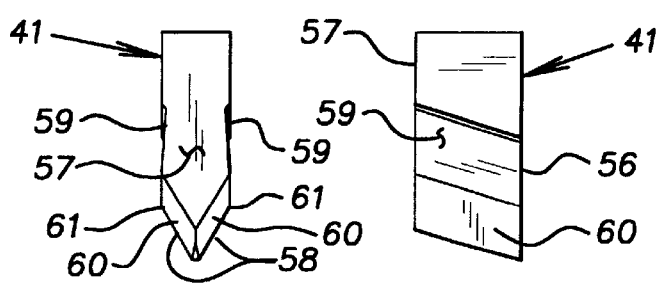
FIG. 5 is a rear elevational view of a typical cutting tool of the invention.
FIG. 6 is a side elevational view of a typical cutting tool.

The cutting tools 41, preferably being identical, are illustrated in detail in FIGS. 5 and 6. The tools 41 are of the chip forming type having leading and trailing faces 56, 57 respectively. A cutting edge 58 of the tool 41, which is V-shaped, is followed in a circumferential sense by relief or undercut areas 60. The maximum width of the tool 41 in the cutting area is represented by two spaced points 61. The width of the tool 41 is reduced radially outward of these points to provide additional relief areas 59 to reduce friction which might otherwise occur along the radial sides 64, 65 of the grooves 52 being cut in the wall of the pipe 11.

The tools 41 are capable of cutting away as much of the wall of the pipe 11 at the grooves 52 as is desired. The axial and radial forces on the pipe 11 are safely sustained by the housing 10 so that the local weakening of the pipe due to the grooves 52 does not create a condition where the pipe can accidentally separate at the grooves. When the grooves 52 are cut to the desired depth, the drive chain 51, tool carrier 26, brackets 46, drive sprocket 48 and motor 49 are disassembled from the housing 10. Thereafter, an end plate can be secured to the lower housing face 20, a valve can be assembled in the bore 15 and a shear plate and related actuator, such as shown in the aforementioned U.S. Patents can be assembled on the upper face 19 of the housing 10. The shear plate can then be forced through the pipe wall in the manner described in such patents. The grooves 52 assure that a coupon of the pipe wall can be cleanly cut from the pipe without the risk of distortion of the pipe axially outwardly of the space between the grooves 52. Typically, the shear plate will be proportioned so that its cutting edges are spaced to operate in the grooves 52 preferably near the axially outer radial faces 64 of the grooves 52.

If desired, prior to assembly of the carrier 26 around the pipe 11, shallow circumferential grooves can be formed in the outer surface of the pipe at planes corresponding to the centers of the grooves 52 by chain mounted roller cutters such as disclosed in aforementioned U.S. Pat. No. 4,370, 995. Chips produced by the cutters 41 can be evacuated from the interior of the housing 10 before the shear plate assembly is mounted on the housing to ensure that there is no risk of chips being introduced into the pipeline once it is severed by the shear plate.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What we claim is:

1. A method of altering the flow in a live pipeline comprising the steps of enclosing a limited length of the pipeline with a housing that is capable of being closed in a fluid tight manner, chip cutting spaced parallel annular grooves on the exterior of the wall of the pipe within the housing while the housing remains stationary with respect to the pipeline with an adjustable mechanism disposed on a rigid tool carrier within said housing to provide relative deep grooves on the wall of said pipe to thereby reduce the effective wall thickness of the pipeline at the planes of the grooves, thereafter cutting a coupon of material from the wall between the planes of the grooves with a shear blade operated in the housing while the housing serves to close a space around the pipeline including the shear plate.

2. Apparatus for preparing a live heavy wall pipeline to be opened at a selected plain site along its length comprising a housing adapted to be closed in a fluid tight manner and arranged to be assembled around the pipeline, a rigid tool carrier adapted to be assembled around the site in the housing, the tool carrier having chip forming cutting tools for cutting peripheral grooves in the wall of the pipeline at axially spaced locations, the carrier having elements for driving it in rotation in the housing about the pipeline while the housing remains stationary with respect to the pipeline, and an adjustable mechanism disposed on said rigid tool carrier within said housing for progressively moving the cutting tools generally radially inwardly so as to progressively increase the depth of the grooves being formed by the cutting tools grooves on the wall of said pipe to prepare it for cutting a coupon from the wall of said pipeline.

3. Apparatus as set forth in claim 2, wherein the carrier has peripheral drive teeth for engagement with drive elements powered by a motor external of the housing.

4. Apparatus as set forth in claim 2, wherein the cutting tools are supported in generally radially oriented guideways.

5. Apparatus as set forth in claim 4, including adjustment screws for controlling the radial position of the cutting tools.

6. Apparatus as set forth in claim 2, wherein the cutting tools have a configuration that includes a maximum width corresponding to the groove being cut by the cutting tool, and a relief portion radially outward of the maximum width to reduce frictional forces.

7. Apparatus as set forth in claim 2, wherein the tool carrier includes a diametrically split roller chain sprocket adapted to be assembled over the pipeline in a plane transverse to the axis of the pipeline.

8. Apparatus as set forth in claim 7, wherein said sprocket is arranged to be driven by a roller chain extending out of the housing.

9. Apparatus as set forth in claim 7, wherein said sprocket is supported by rollers for rotation about said pipeline.

* * * * *

UNITED STATES PATENT AND TRADEMARK OFFICE
CERTIFICATE OF CORRECTION

PATENT NO.    : 6,131,597
DATED         : October 17, 2000
INVENTOR(S)   : Kerrigan Mendicino et al.

It is certified that error appears in the above-identified patent and that said Letters Patent is hereby corrected as shown below:

<u>Title page</u>,
Item [73], Assignee, should read -- The Pipe Line Development Company, Westlake, Ohio --.

<u>Column 1</u>,
Line 54, delete "illustrated' " and insert -- illustrated --.

<u>Column 4</u>,
Line 42, after "tools" insert -- to provide relative deep --.

Signed and Sealed this

Second Day of July, 2002

Attest:

JAMES E. ROGAN
*Attesting Officer*     *Director of the United States Patent and Trademark Office*